US006962381B2

(12) United States Patent
Warning

(10) Patent No.: US 6,962,381 B2
(45) Date of Patent: Nov. 8, 2005

(54) STOWABLE SINK FOR A VEHICLE

(75) Inventor: Anthony Warning, Elkhart, IN (US)

(73) Assignee: D & W Incorporated, Elkhart, IN (US)

(*) Notice: Subject to any disclaimer, the term of this patent is extended or adjusted under 35 U.S.C. 154(b) by 0 days.

(21) Appl. No.: 10/966,235

(22) Filed: Oct. 15, 2004

(65) Prior Publication Data

US 2005/0055766 A1    Mar. 17, 2005

Related U.S. Application Data

(63) Continuation-in-part of application No. 10/661,203, filed on Sep. 12, 2003, now Pat. No. 6,817,642.

(51) Int. Cl.[7] .............................................. B62D 39/00
(52) U.S. Cl. ..................... 296/1.07; 296/156; 296/37.5
(58) Field of Search .............................. 296/1.01, 1.07, 296/156, 37.5, 146.1

(56) References Cited

U.S. PATENT DOCUMENTS

| 140,243 A | 6/1873 | Byrne |
| 2,867,471 A | * 1/1959 | Coon, Jr. ..................... 296/156 |
| 3,692,351 A | * 9/1972 | Christopher et al. ......... 296/156 |
| 5,029,935 A | * 7/1991 | Dufrancatel ................. 296/156 |
| 5,649,734 A | 7/1997 | Speis |
| 5,800,002 A | 9/1998 | Tiedge et al. |
| 6,098,346 A | 8/2000 | Miller et al. |
| 6,254,160 B1 | 7/2001 | Marriott et al. |

FOREIGN PATENT DOCUMENTS

| DE | 4109248 A | * 9/1992 |
| DE | 4109248 A1 | 9/1992 |

* cited by examiner

*Primary Examiner*—Jason Morrow
(74) *Attorney, Agent, or Firm*—Baker & Daniels

(57) ABSTRACT

A sink assembly for use on a vehicle that in one embodiment includes a mounting frame with an opening for mounting the sink assembly to the vehicle. The sink assembly also includes a door that is movable relative to the mounting frame and a sink top connected to the door. The sink top has a sink bowl with a drain, and is movable between a stowed position when not in use or when the vehicle is traveling to an operational position for use of the sink assembly. The sink assembly also includes at least one attachable plumbing apparatus that is connectable to a fluid source. The sink assembly may further include a storage container for storing the plumbing apparatus when not in use or when the sink top is in the stowed position. The plumbing apparatus may include at least one of a faucet or a hose assembly.

20 Claims, 14 Drawing Sheets

STOWABLE SINK FOR A VEHICLE

This application claims the benefit of U.S. patent application Ser. No. 10/661,203 filed Sep. 12, 2003, now U.S. Pat. No. 6,817,642 the complete disclosure of which is hereby expressly incorporated by reference.

BACKGROUND OF THE INVENTION

This invention relates generally to accessories for recreational vehicles, and in particular, to a stowable sink and attachments for use on the outside of a recreational vehicle.

Various types of vehicles are used and sold for recreational purposes and commercial purposes. When referred to herein, recreational vehicles or commercial vehicles shall refer to motor homes, travel trailers, campers and the like, as well as water craft, such as pleasure boats and pontoons. For example, a typical recreational vehicle is shown in U.S. Pat. No. 5,800,002, which is a motor driven style motor home having an interior living area defined by outer walls, including side walls along both sides. Recreational vehicles (RV's) and marine craft carry a supply of fresh water for the convenience of the vehicle occupants while using the vehicle. In addition to internal uses, the user may also require fresh water outside the vehicle for such activities as washing or rinsing the vehicle exterior or washing or rinsing bicycles, scooters or trailered off-road vehicles such as all-terrain vehicles (ATV's) or motorcycles and the like. Depending on the activity being engaged in, the user himself or herself may want to wash his or her hands or rinse off gear, apparel, tools or equipment before re-entering the vehicle. In addition, trailered boats and watercraft benefit from a fresh water rinse after use.

Typically the user must locate a source of fresh water which often requires that the user drive or trailer the equipment or accessory to a location providing fresh water. In addition to being inconvenient, this allows dirt, foreign matter, or contaminants to dry or otherwise set on the items leaving undesirable deposits that become harder to remove at a later time. This can be particularly troublesome when exposure to salt water or corrosive materials is involved or where immediate fresh water flushing of the accessory after use is recommended.

Accordingly, a need exists for an apparatus that allows the user convenient access to a sink and the on board or other fresh water supply while outside the vehicle.

SUMMARY OF THE INVENTION

The present invention provides a sink assembly for use on a vehicle. In one embodiment, the sink assembly includes a mounting frame for mounting the sink assembly to the vehicle, wherein the mounting frame has an opening. The sink assembly also includes a door that is movable relative to the mounting frame and a sink top connected to the door. The sink top has a sink bowl with a drain, and the sink top is movable between a stowed position when not in use or when the vehicle is traveling to an operational position for use of the sink assembly. The sink assembly also includes at least one attachable plumbing apparatus that is connectable to a fluid source.

The sink assembly may further include a storage container for storing the plumbing apparatus when not in use or when the sink top is in the stowed position. The plumbing apparatus may include at least one of a faucet or a hose assembly. The sink assembly may also include a fluid inlet line that has a fitting attached and is connectable to the plumbing apparatus. At least a portion of the fluid inlet line may be located within the storage container, and the fluid inlet line may extend through an aperture in a bottom surface of the storage container toward the sink top.

The sink assembly in one embodiment further includes a valve coupled to the fitting of the fluid inlet line. The valve may be operable between a first state enabling fluid flow and a second state inhibiting fluid flow. In one embodiment, the valve is a quick connect coupling and stopper valve. The plumbing apparatus may have a fitting connectable to the quick connect coupling.

The door may be attached to the mounting frame with a hinged connection. The hinged connection may be at a lower end of the frame. An embodiment of the invention is also provided wherein at least a portion of the sink top moves through the opening in the mounting frame as the sink top moves between the stowed position and the operational position.

In another embodiment of the invention, a sink assembly for use on a vehicle is provided that includes a mounting frame for mounting the sink assembly to the vehicle. A sink top is mounted to be movable relative to the frame between a stowed position for when the sink assembly is not in use or when the vehicle is traveling and an operational position for use of the sink assembly. The sink top includes a sink bowl. The sink assembly includes at least one plumbing apparatus that is connectable to a fluid source for dispensing the fluid and a storage container for storing the plumbing apparatus when the sink top is in the stowed position.

The sink assembly may include two plumbing apparatuses that consist of a faucet and a hose assembly. The sink assembly may also include a fluid inlet line that has a fitting, which is connectable to the plumbing apparatuses. A valve may be included that is coupled to the fitting on the fluid inlet line that is operable between a first state enabling fluid flow and a second state inhibiting fluid flow. The valve may be a quick connect coupling and stopper valve. At least a portion of the fluid inlet line may be located in the storage container.

The sink assembly may further include a door, and the sink top may be attached to the door. In one embodiment, the door may be attached to the mounting frame with a hinged connection that provides movement of the sink top from the stowed position to the operational position. The sink top may also have an opening, and the storage container may be mounted to the sink top beneath the opening.

In a further embodiment of the invention, a vehicle is provided that includes vehicle sidewalls, wherein at least one of the sidewalls has an aperture therethrough. The vehicle may include a water supply system and a mounting frame mounted about the aperture in the side wall. A door for covering the aperture may also be provided that is movable relative to the mounting frame. The vehicle may also include a sink top that is connected to the door that is movable through the aperture between a stowed position when not in use or when the vehicle is traveling and an operational position for use of the sink top. A plumbing apparatus may also be included that is connected to the water supply system for dispensing the water.

In one embodiment, the door lies substantially parallel with the sidewall that has the aperture when said sink top is in the stowed position, and the door is at an angle to the sidewall having the aperture when the sink top is in the operational position.

The sink top may also be located substantially on the exterior of the vehicle in the operational position and perpendicular to the sidewall having the aperture, and the sink top may be located within the vehicle in the stowed position at an inclined orientation.

The vehicle may further include a storage container for storing the plumbing apparatus when the sink top is in the stowed position. The sink top may include an opening, and the storage container may be mounted beneath the opening. A fluid inlet line may be included, and at least a portion of the fluid inlet line may be located in the storage container.

In yet another embodiment, a vehicle is provided that includes a water supply system and sidewalls, and at least one of the sidewalls has an aperture therethrough. The vehicle may include a mounting frame about the aperture and a sink top that is movable relative to the frame between a stowed position wherein the sink top is located within the vehicle when not in use or for travel and an operational position wherein the sink top is located substantially on the exterior of the vehicle. At least one plumbing apparatus may be provided that is connectable to the water supply system for dispensing the water. The vehicle may also include a storage container for storing the plumbing apparatus when the sink top is in the stowed position.

The sink top may have an opening therethrough, and the storage container may be mounted to the sink top beneath the opening. A fluid inlet line may also be included that is at least partially located within the storage container.

The vehicle may also include a door, wherein the door covers the aperture when the sink top is in the stowed position. The door may be movable relative to the sidewall having the aperture, and the sink top may be connected to the door.

In another embodiment of the invention, a sink assembly is provided for use on a vehicle and includes a mounting frame for mounting the sink assembly to the vehicle, the mounting frame being pivotally attached to the vehicle; a door movable relative to the mounting frame and covering an opening in the vehicle; a sink top having a sink bowl with a drain, the sink top moveable through the opening between a stowed position in the vehicle when not in use or when the vehicle is traveling to an operational position for use of the sink assembly; and at least one attachable plumbing apparatus connectable to a fluid source through a fitting mounted to the vehicle above the opening.

The sink may further include a storage container for storing the plumbing apparatus when not in use or when the sink top is in the stowed position. The plumbing apparatus may be at least one of a faucet or a hose assembly.

The sink assembly of claim 3, further including a valve coupled to said fitting of said fluid inlet line, said valve operable between a first state enabling fluid flow and a second state inhibiting fluid flow. The valve may be a quick connect coupling and stopper valve, and the plumbing apparatus may have a fitting connectable to the quick connect coupling.

The door may be attached at the opening with a hinged connection, and the hinged connection may be on a side of said door.

The sink top may hang in a generally vertical orientation when the sink is in the stowed position, and a front portion of the sink top may hang below a back portion when in the stowed position. The front portion may swing up when the sink top is moved to the operational position.

It is also a feature of the invention to provide a sink assembly for use on a vehicle that includes a mounting frame for mounting the sink assembly to the vehicle, the mounting frame being pivotally attached to the vehicle; a door moveable relative to the mounting frame and covering an opening in the vehicle; a sink top having a sink bowl with a drain, the sink top being movable through the opening between a stowed position in the vehicle when not in use or when the vehicle is traveling to an operational position for use of the sink assembly, and the sink top having a front portion and a rear portion, the front portion hanging below the rear portion in the stowed position, and the front portion swinging up to the operational position.

The sink assembly may further include a brace that supports the front portion of the sink top when in the operational position.

The sink assembly may further include a storage container for storing a plumbing apparatus when not in use. The storage container may be located beneath the sink top.

The mounting frame of the sink assembly may include members lying in a plane that is substantially the same as a plane defined by the sink top, and other members lying in a plane generally perpendicular to the plane defined by said sink top.

The sink may further including a fitting mounted to the vehicle above the opening for attachment of a plumbing apparatus.

It is also a feature of the invention to provide a sink assembly for use on a vehicle that includes: a mounting frame, which is moveably mounted adjacent an opening in a side wall of the vehicle; a sink top moveable between a stowed position wherein the sink top is located within the vehicle when not in use or for travel to an operational position wherein the sink top is located substantially on the exterior of the vehicle; at least one plumbing apparatus connectable to the water supply system for dispensing water; and a storage container for storing the plumbing apparatus when not being used.

At least a portion of the sink top may move through the opening in the sidewall of the vehicle as the sink top moves between the stowed position and the operational position.

The sink top may be at a generally vertical orientation when in the stowed position and in a generally horizontal orientation in the operational position. The sink top has a front portion and a rear portion, and the front portion may be lower than the rear portion when the sink assembly is in the stowed position, and the front portion swings up to the operational position.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
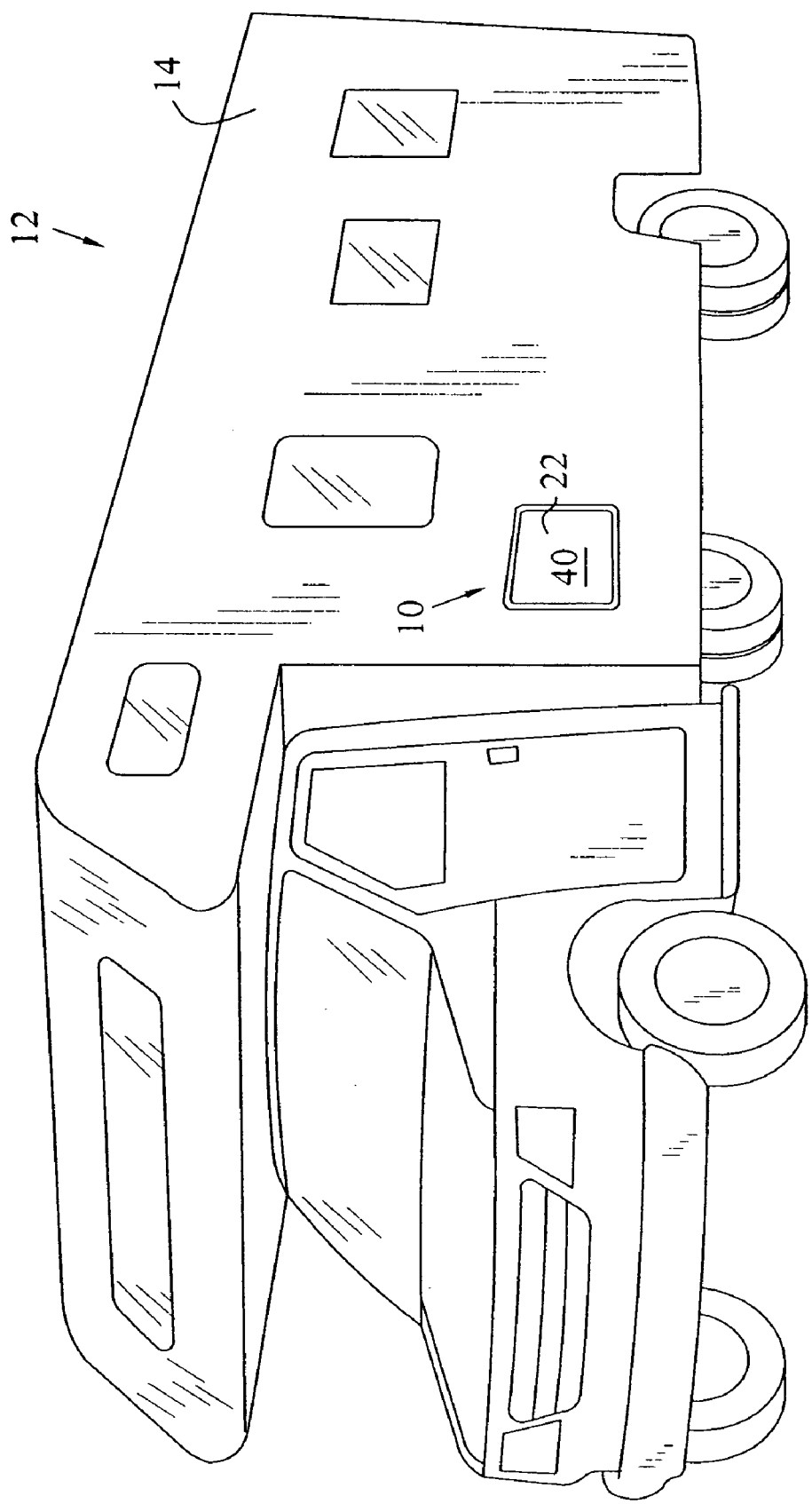
FIG. 1 is a perspective view of a recreational vehicle having a swing out sink with the sink shown in a stowed position.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in one form, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
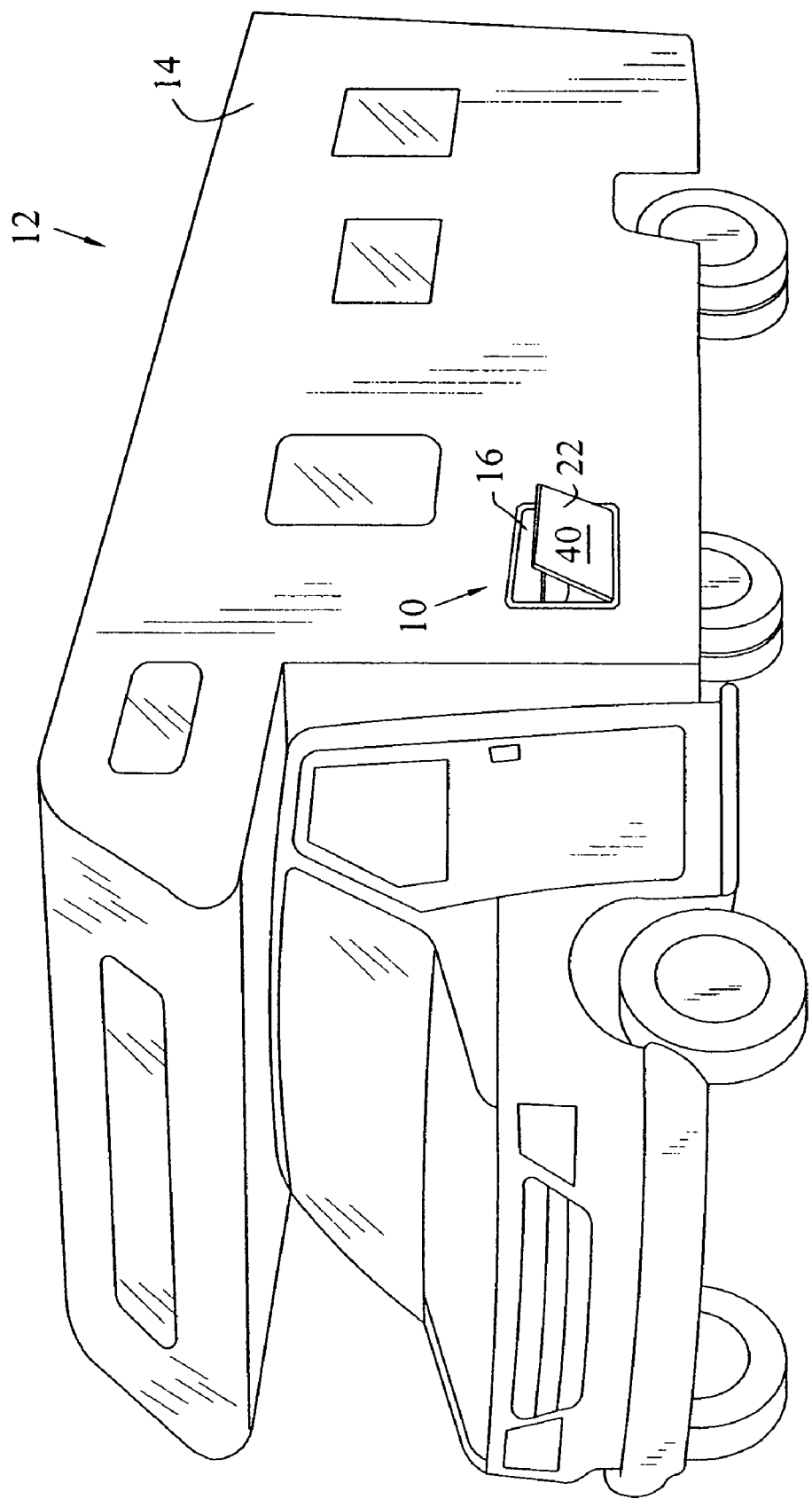
FIG. 2 is a perspective view of the recreational vehicle of FIG. 1 with the sink shown in an operational position.

With reference first to FIGS. 1 and 2, the invention relates to a stowable sink assembly generally indicated as 10 that is designed for use on the exterior of a recreational vehicle generally indicated as 12. Recreational vehicle 12 includes a side wall 14 having an aperture 16 (FIG. 2), where sink assembly 10 is mounted.

Referring now to FIGS. 3–10, sink assembly 10 includes a mounting frame generally indicated as 20, a door 22, a sink top generally indicated as 24, a storage container generally indicated as 26, a faucet/plumbing apparatus generally indicated as 28, and a hose assembly/plumbing apparatus generally indicated as 29.

Figure 3:
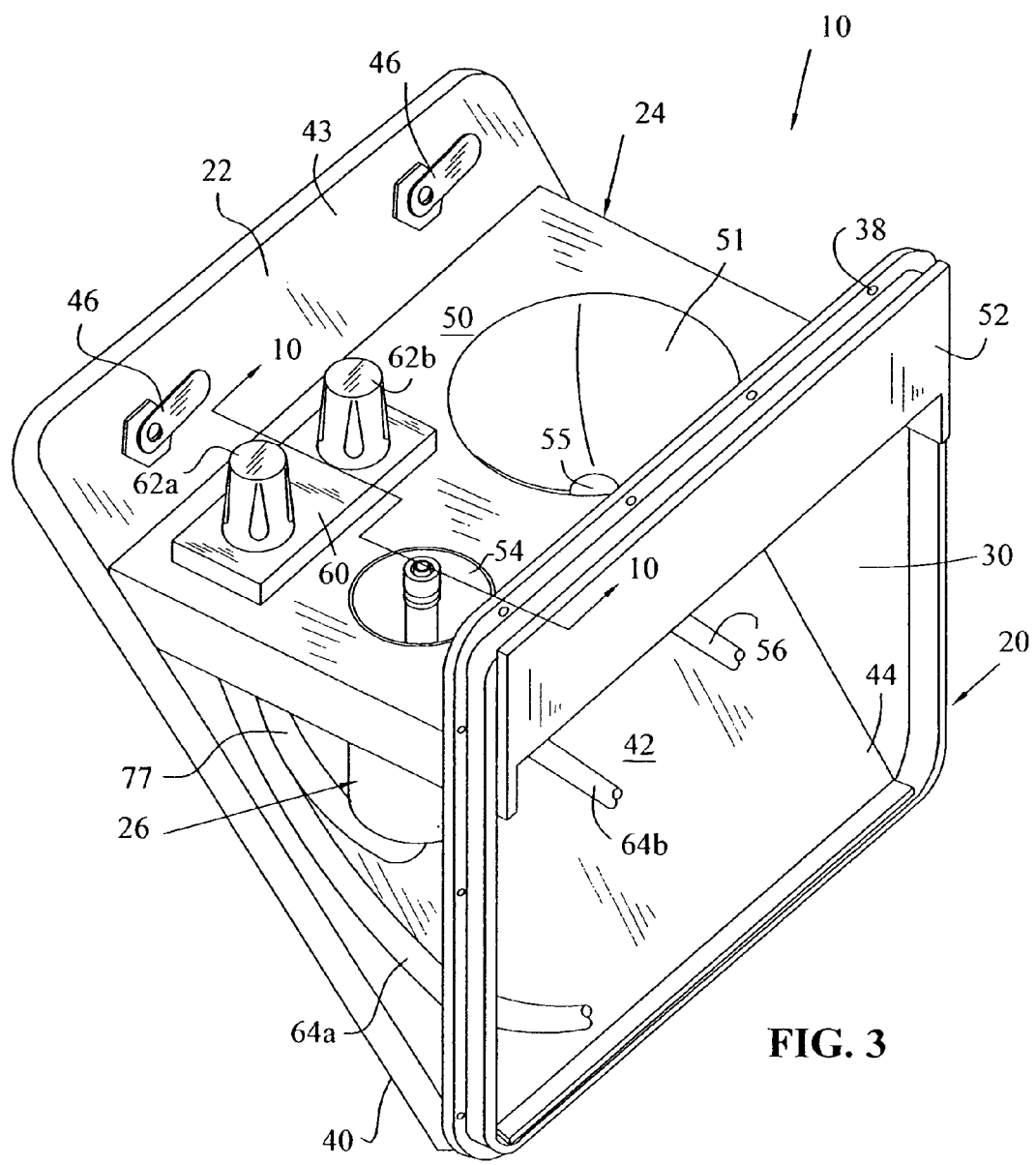
FIG. 3 is a rear perspective view of the sink in the operational position without any attachments and removed from the recreational vehicle for clarity.
Figure 4:
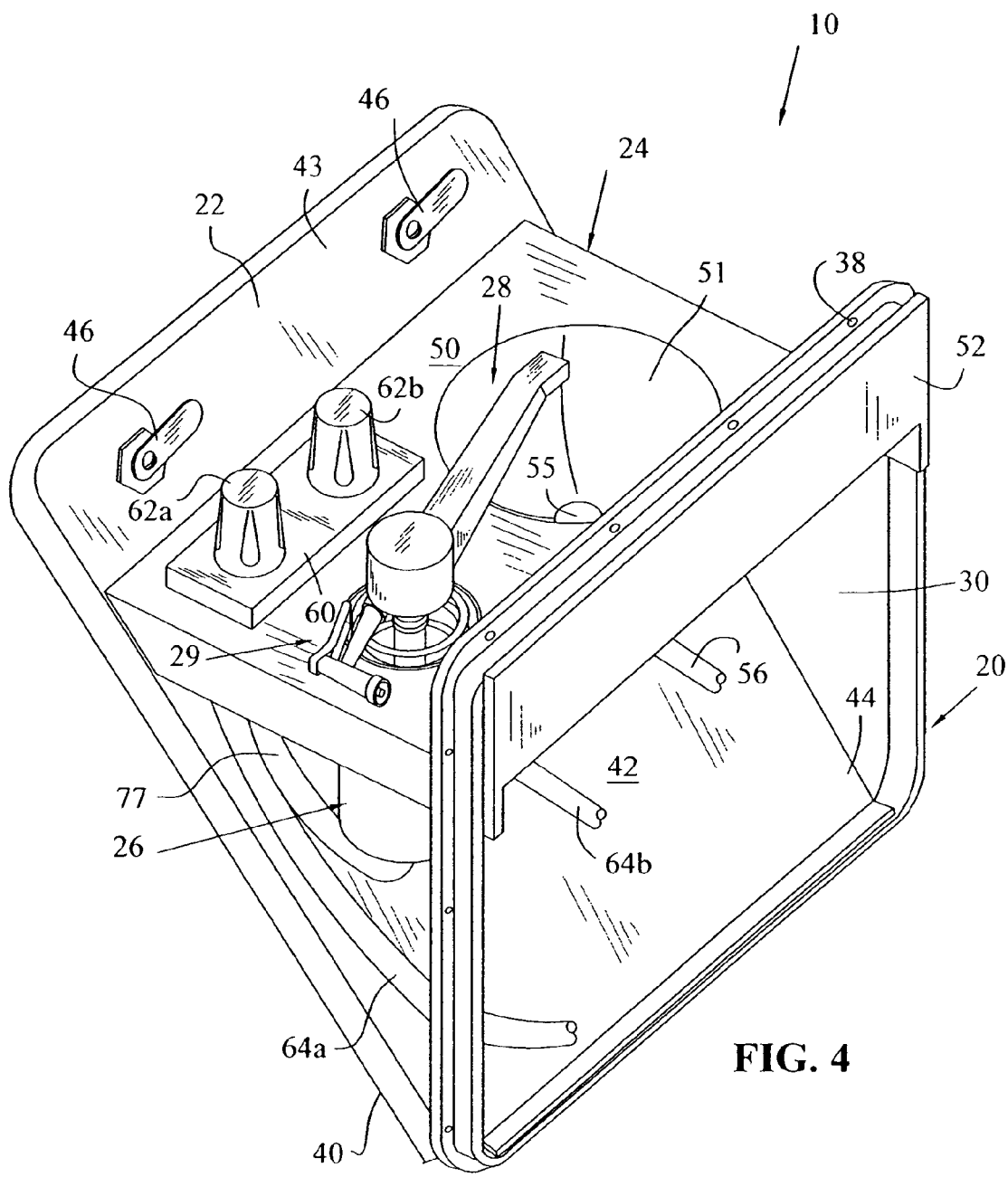
FIG. 4 is a view of the sink as shown in FIG. 3 with a faucet attached and a hose assembly in a storage container.
Figure 5:
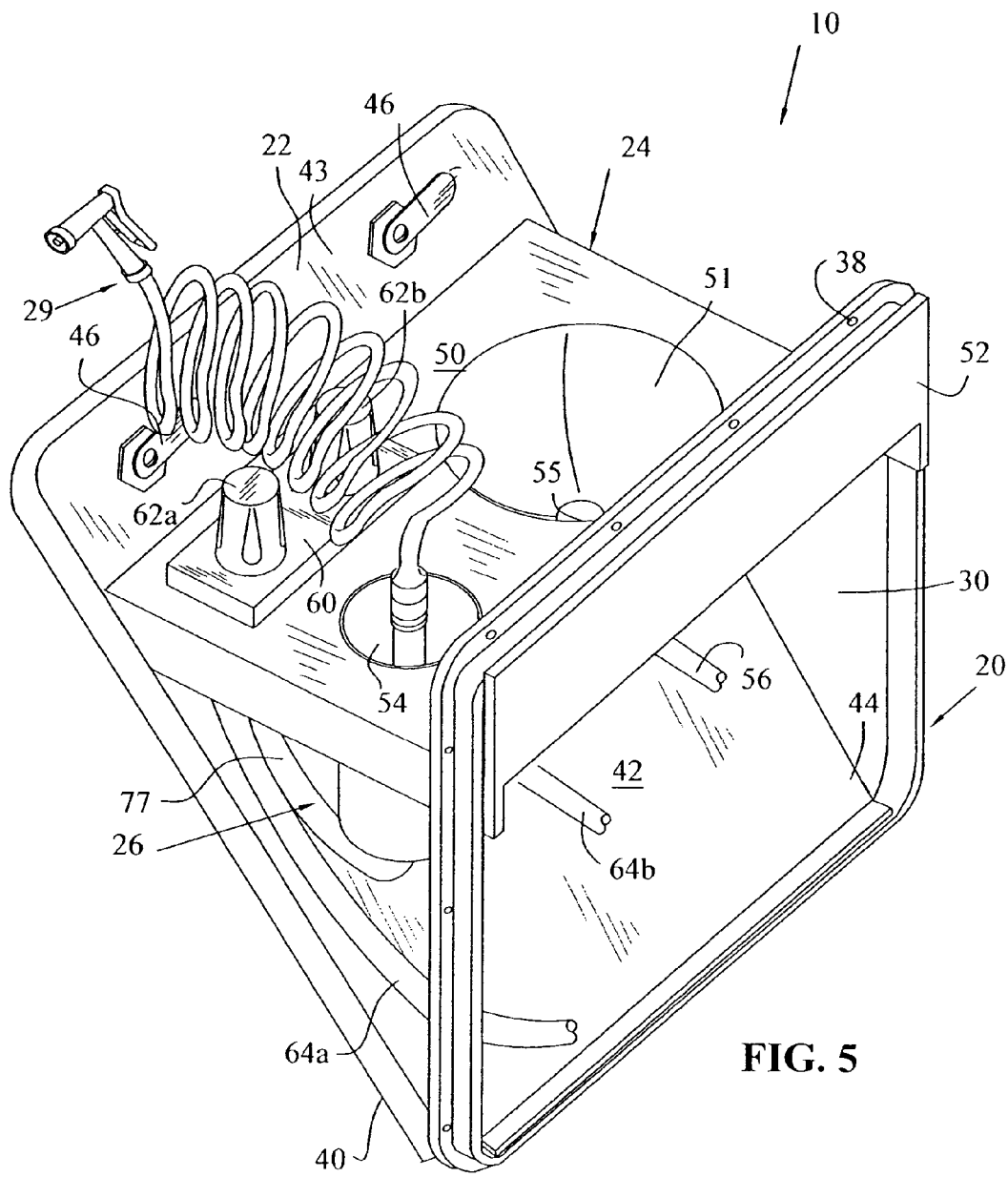
FIG. 5 is a view of the sink as shown in FIG. 3 with the hose assembly attached.
Figure 10:
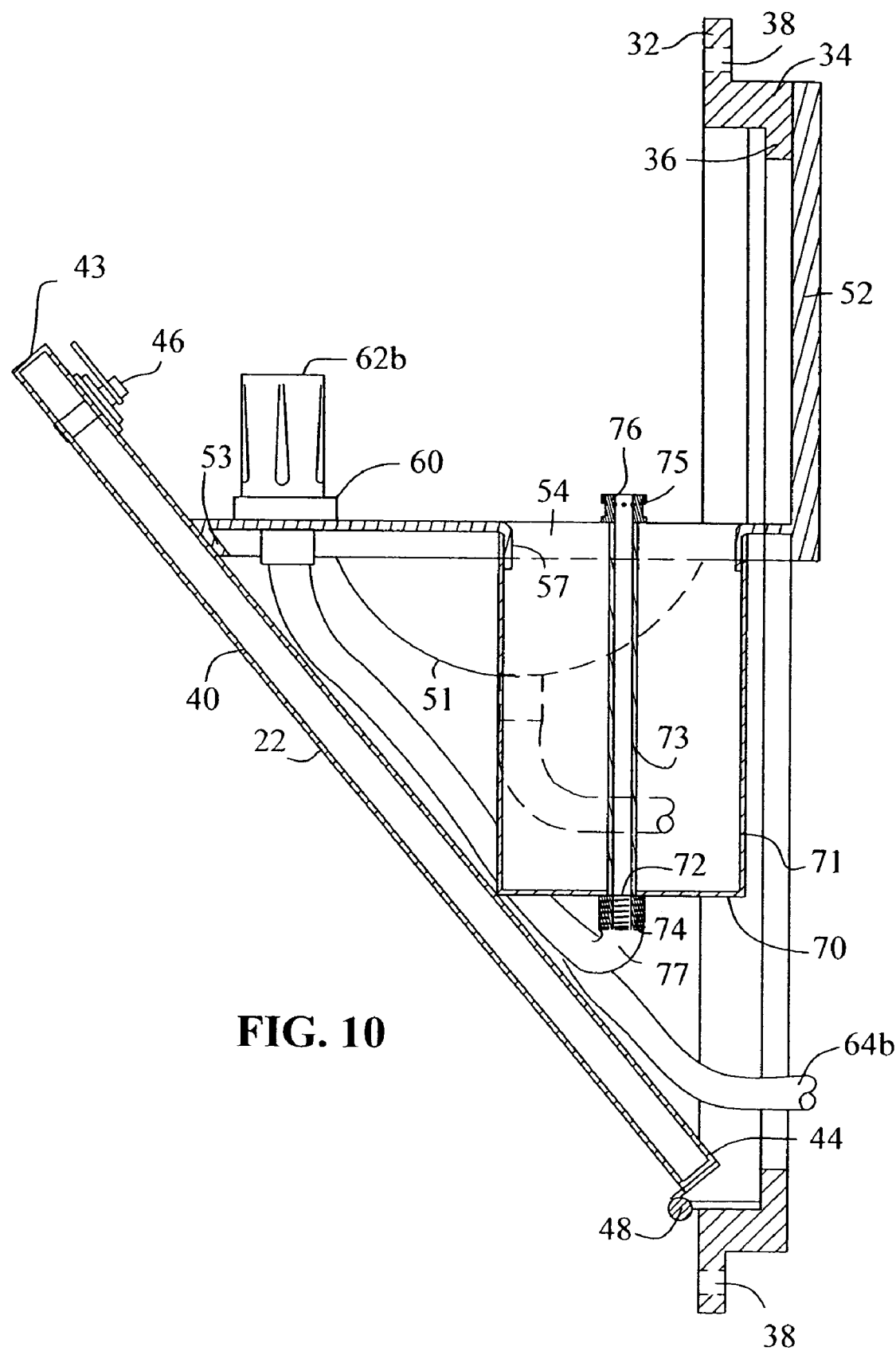
FIG. 10 is a cross-sectional view taken as shown in FIG. 3 through the storage container.

In the embodiment shown, mounting frame 20 has a generally rectangular configuration having a central opening 30 (FIGS. 3–5). Frame 20 includes an outwardly extending mounting flange 32, a central portion 34 and an inwardly extending sealing flange 36 (FIG. 10). Mounting flange 32 includes apertures 38 for mounting sink assembly 10 to recreational vehicle 12.

Figure 6:
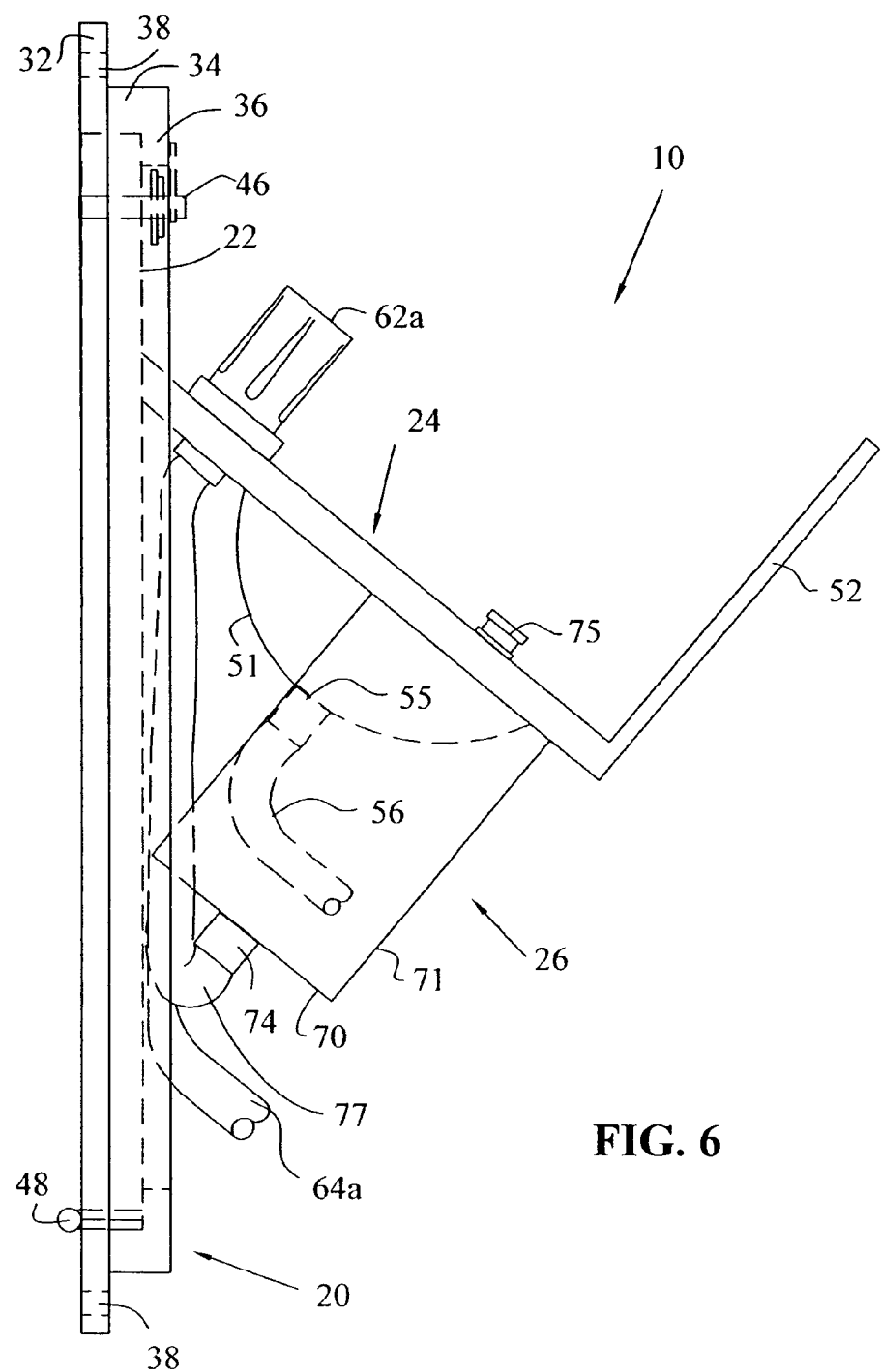
FIG. 6 is a side view of the swing out sink of FIG. 3 shown in the stowed position.
Figure 7:
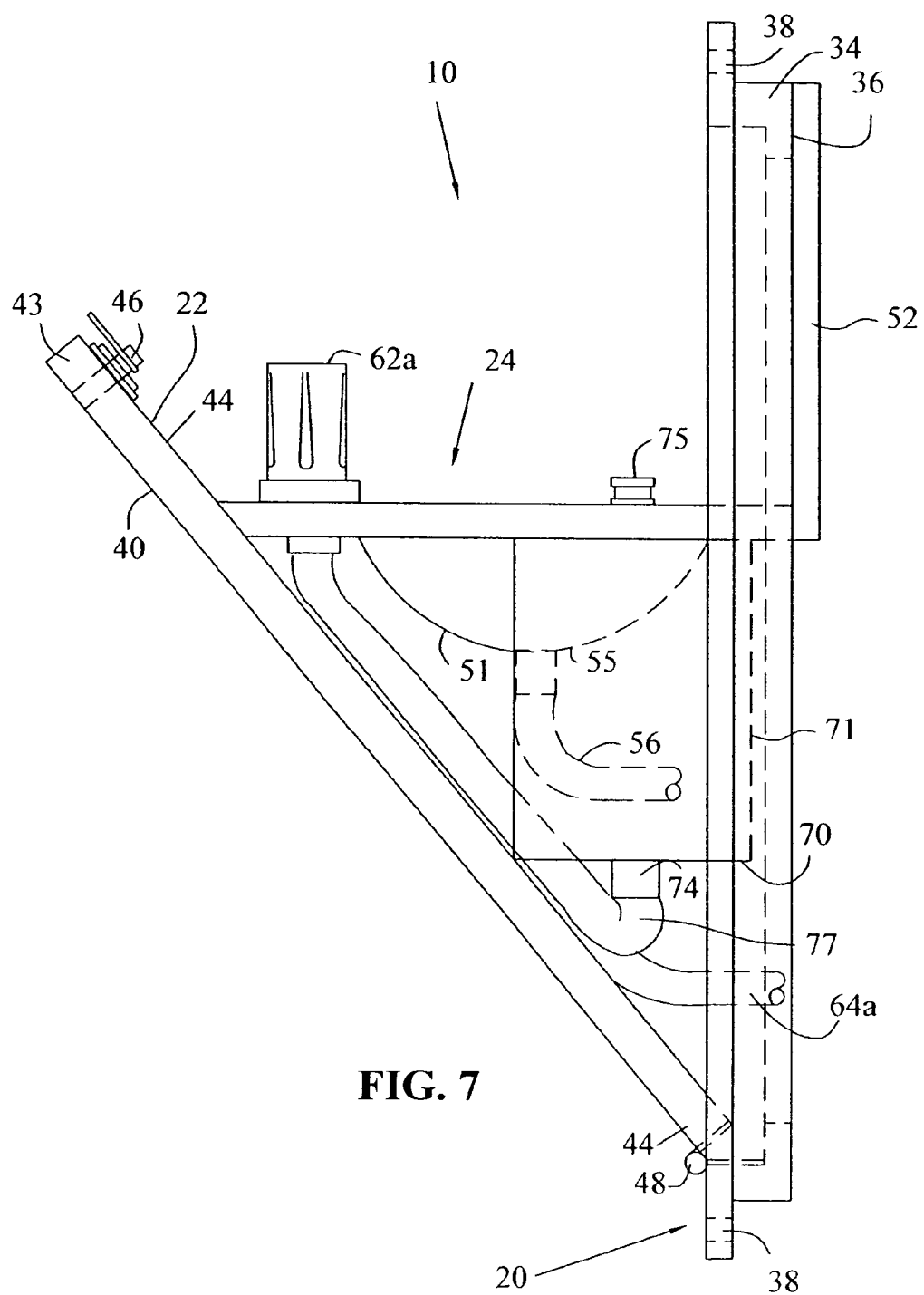
FIG. 7 is a side view of the swing out sink of FIG. 3 shown in the operational position.

Door 22 includes an outer surface 40, an inner surface 42, an upper end 43, and a lower end 44. Door 22 also includes a locking latch 46 located at upper end 43 for locking the door in a stowed position as shown in FIGS. 1 and 6. Door 22 also includes a hinged connection 48 at lower end 44 to attach the door to and allow pivotal movement relative to mounting frame 20.

Sink top 24 includes a working surface 50, a sink bowl 51 extending down from the working surface, a back stop 52 extending substantially perpendicular upward from working surface 50, a frontal extension 53 extending downwardly and rearwardly from the front of working surface 50, and an opening 54 (FIGS. 3 and 10). Sink bowl 51 contains a drain opening 55 at the bottom thereof and a fluid outlet line 56, which is connected to a drain or gray tank (not shown) for discarding used fluid. Sink top 24 also includes a circumferential flange 57 extending downwardly from working surface 50 about opening 54.

A fluid control valve assembly 60 is also attached to sink top 24 upon working surface 50. Fluid control valve assembly 60 includes a pair of fluid control knobs 62a, 62b for controlling fluid flow to faucet 28 or hose assembly 29, whichever may be attached. Fluid control knobs 62a, 62b are connected to separate fluid inlet lines 64a, 64b, respectively, which may be coupled to different fluid sources such as a cold water supply tank and a hot water supply tank (not shown) contained in recreational vehicle 12.

Storage container 26 has a generally cylindrical configuration in the embodiment shown including a bottom wall 70 and a side wall 71 as best shown in FIG. 10. The top of storage container 26 is open; however, a cover or lid (not shown) maybe provided. Storage container 26 also contains an aperture 72 in bottom wall 70 through which a fluid inlet line 73 is inserted and extends longitudinally upward through the center of storage container 26. Fluid inlet line 73 has an inlet fitting 74 at one end located below bottom wall 70 of supply container 26 and an outlet fitting 75 at an opposite end thereof. A valve 76 can be attached to the outlet fitting 75 to control fluid flow through the system. In one embodiment, the valve 76 is a quick connect coupling and stopper valve; however, any of various fluid control valves well known in the art can also be employed. In the preferred version, fluid inlet line 73 is a PVC-type tube, but it should be appreciated that any type of suitable tubing may be used. A supply line 77 is connected between inlet fitting 74 on the fluid inlet line and the fluid control valve assembly 60.

Figure 9:
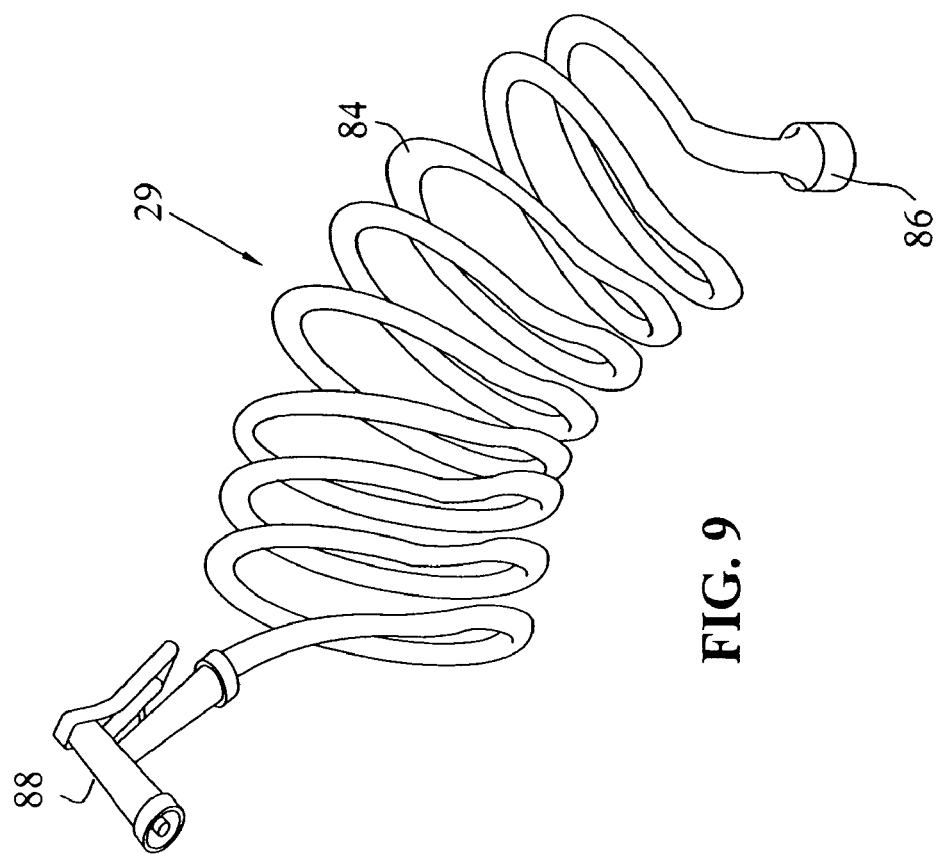
FIG. 9 is a perspective view of the hose assembly attachment.
Figure 8:
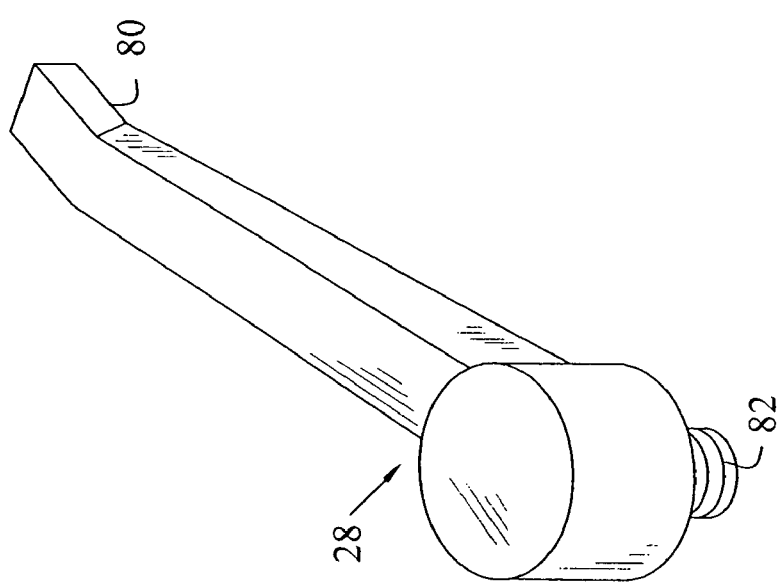
FIG. 8 is a perspective view of the faucet attachment.

With reference now to FIGS. 8 and 9, faucet 28 and hose assembly 29 are shown in greater detail. In the embodiment of FIG. 8, faucet 28 includes a nozzle 80 for dispensing fluid and a male quick connect coupling 82 for connecting to valve 76, which in the embodiment shown has a female quick connect coupling. Hose assembly 29 includes a hose 84 with a male quick connect coupling 86 in the embodiment shown that is also connectable to the female quick connect coupling of valve 76. Hose assembly 29 also includes a flow controlling nozzle 88 at the other end of hose 84 opposite of quick connect coupling 86. Hose assembly 29 is shown pre-coiled as an illustration of an embodiment that is well suited for storage in storage container 26; however, there is no intent to limit the invention to such a pre-coiled hose. Furthermore, other features of faucet 28 and hose assembly 29 including the nozzle and couplings are shown for the purpose of illustration only and not intended to limit the invention.

It should be appreciated as mentioned above, that when assembled, sink assembly 10 may be mounted through the side wall of a recreational vehicle. The unit may be mounted through an opening in the side wall, with fasteners (not shown) such as bolts or screws to hold the assembly in place. With reference to FIGS. 1 and 2, the sink assembly is shown mounted to side wall 14 of recreational vehicle 12 through aperture 16. It should be appreciated that aperture 16 is cut through side wall 14 such that it is wider than sink top 24, but smaller than the profile of mounting flange 32. Fasteners (not shown) are inserted through holes 38 in mounting flange 32 to retain sink assembly 10 in place in sidewall 14. It should also be appreciated that fluid inlet lines 64a, 64b are connected to the plumbing system (not shown) of the vehicle through corresponding fittings (not shown) to supply fluid pressure to fluid control valve assembly 60. As discussed above, fluid inlet lines 64a, 64b may be connected to respective hot and cold water tanks, or may be connected to shore water supply lines (not shown).

Also, as discussed above, door 22 is connected to mounting frame 20 with hinged connection 48 so that the door may be swung down and pivot about its lower end 44. In the embodiment shown for illustrative purposes only, sink 24 is attached to door 22 by using an adhesive or fasteners (not shown) to mount frontal extension 53 of sink top 24 to the door (FIG. 10). Storage container 26 is mounted to circumferential flange 57 of sink top 24 using an adhesive or fasteners (not shown) so that it is accessible through opening 54 in the sink top. It should also be appreciated that faucet 28 and hose assembly 29 may be stored in storage container 26 when the sink assembly is in the stowed position as shown in FIGS. 1 and 6.

In operation, sink assembly 10 may be moved between the stowed position as shown in FIGS. 1 and 6, wherein door 22 is substantially parallel to sidewall 14 to an operational position as shown in FIGS. 2–5, 7, and 10, wherein the door is swung down about hinged connection 48 so that it is at an angle to sidewall 14. In the stowed position, sink top 24 is contained within recreational vehicle 12 at an inclined orientation and may be locked in position with locking latch 46, which may be rotated to catch upon sealing flange 36 of frame 20. It should be appreciated that a sealing member (not shown) such as a foam strip or other resilient member may be attached to the periphery of either one or both inner surface 42 of door 22 or the exterior side of sealing flange 36 to provide a sealing engagement between the door and sealing flange when the assembly is in the stowed and locked position.

When it is desired to use sink assembly 10, locking latch 46 may be rotated so that it no longer engages sealing flange 36, and door 22 swung down to the operational position. In the embodiment shown, for illustration purposes only, sink top 24 is stopped in the operational position by backstop 52 contacting the back of sealing flange 36. The weight of the assembly will maintain it in the operational position; however, it should be appreciated, that the backstop may be secured to the sealing flange during use by using magnetic strips (not shown), snap locks (not shown) or other known mechanisms for providing a releasable engagement.

When the sink assembly 10 is in the operational position, a plumbing apparatus, either faucet 28 or hose assembly 29, is selected for use, and the respective quick connect coupling 82 or 86 is attached to the quick connect coupling on valve 76. The remaining apparatus can continue to be stored in the storage container 26 while the other is being used. When either one or both of fluid control knobs 62a, 62b are activated, water can be dispensed from the attached plumbing apparatus. Sink bowl 51 provides a catch for dispensed water, which will be discarded through drain 55 and fluid outlet line 56. It should also be appreciated that valve 76 on outlet fitting 75 precludes accidental fluid flow in the event fluid control knobs 62a or 62b are activated before a plumbing apparatus is attached to the quick connect coupling. Accordingly, sink assembly 10 provides an easy, convenient access to water and a sink from the exterior of the recreational vehicle 12.

While the invention has been taught with specific reference to the above embodiment, one skilled in the art will recognize that changes can be made in form and detailed without departing from the spirit and scope of the invention. For example, although sink assembly 10 swings out from the stowed position to the operational position in the above embodiment, it would also be possible to have the sink top mounted on a slide out mechanism. In addition, the sink top could be mounted with a hinged connection directly to the frame as opposed to mounting it to door 22, which is mounted with the hinged connection.

Sink assembly 10 may also be stopped at the operational position with mechanisms other than backstop 52. For example, a cables, chains, or pivoting and/or folding arms may be attached between door 22 and frame 20, or an arcuate arm with a stop at one end may be used to secure the sink assembly in the operational position. Other known latches or locks may also be used to secure the sink assembly in the stowed position.

With reference now to FIGS. 11–15, an alternate embodiment stowable sink assembly is shown generally indicated as 110. Stowable sink assembly 110 is designed for use on the exterior of recreational vehicle 12, and includes a mounting frame generally indicated as 120, a door 122, a sink top generally indicated as 124, and a storage container generally indicated as 126.

Mounting frame 120 includes a rectangular portion generally indicated as 130 having side members 132a, 132b that are located beneath and support sides of sink top 124. A front member 134 of rectangular portion 130 connects side members 132a, 132b at the front of mounting frame 120 and can be used as a towel rack for hanging towels (not shown). A rear member 135 forms the back of rectangular portion 130. Rear member 135 includes a pair of mounting pins 135a (FIG. 15) extending from the ends thereof to pivotally mount sink assembly 110 to recreational vehicle 12. Extending from rectangular portion 130 of mounting frame 120 are leg members 136a, 136b and a cross member 137. Sink mounting frame 120 also includes a pair of storage container support members 138a, 138b having a generally U-shape configuration and attached to respective side members 132a, 132b. Mounting frame 120 may be manufactured from tubular, rectangular, solid, channel, or other known structural members from a metal or other suitably rigid material. The frame members may be welded, bolted, adhered or otherwise attached in a known manner.

Figure 11:
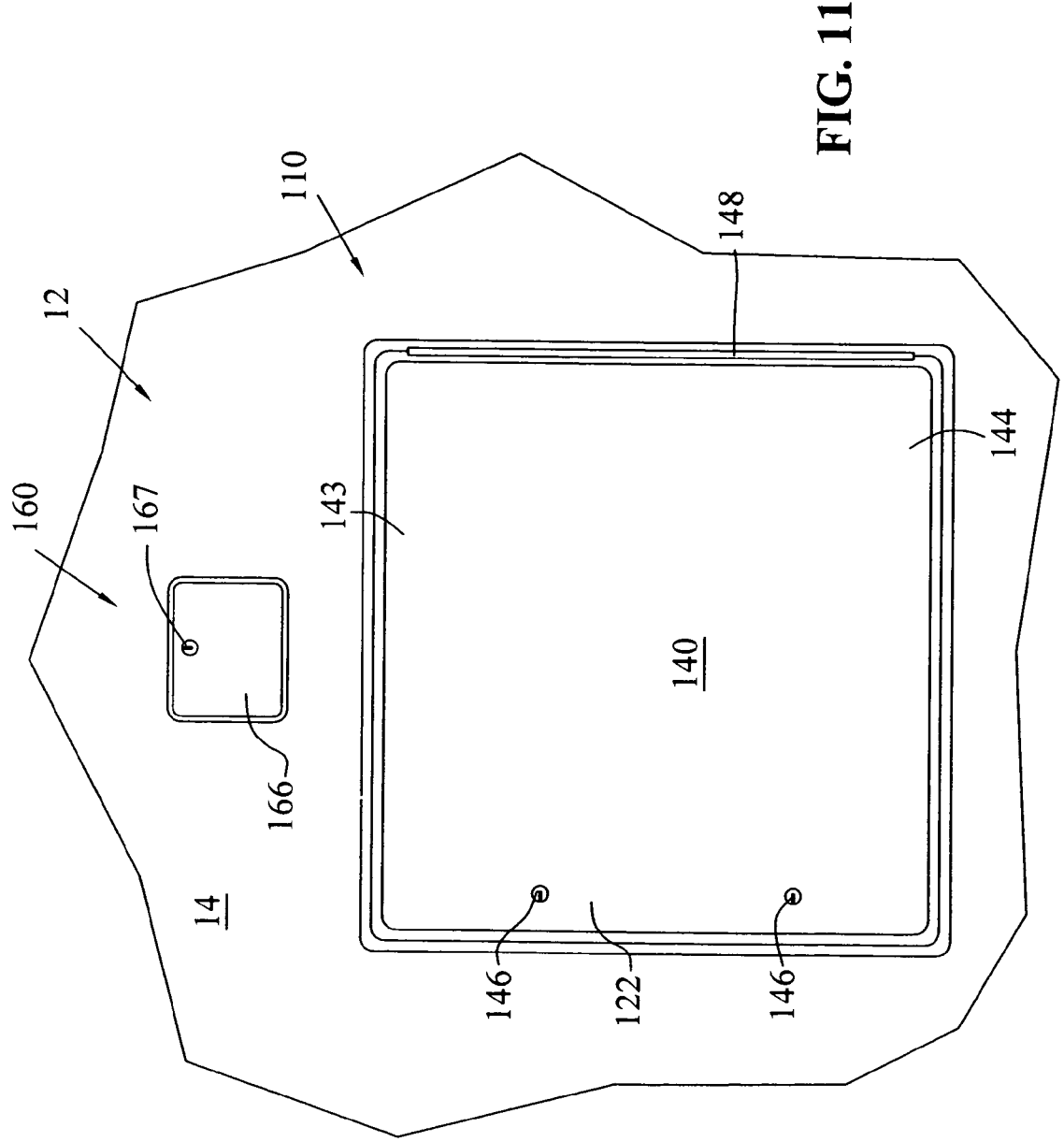
FIG. 11 is a plan view of an alternate embodiment swing out sink with the sink shown in a stowed position.
Figure 15:
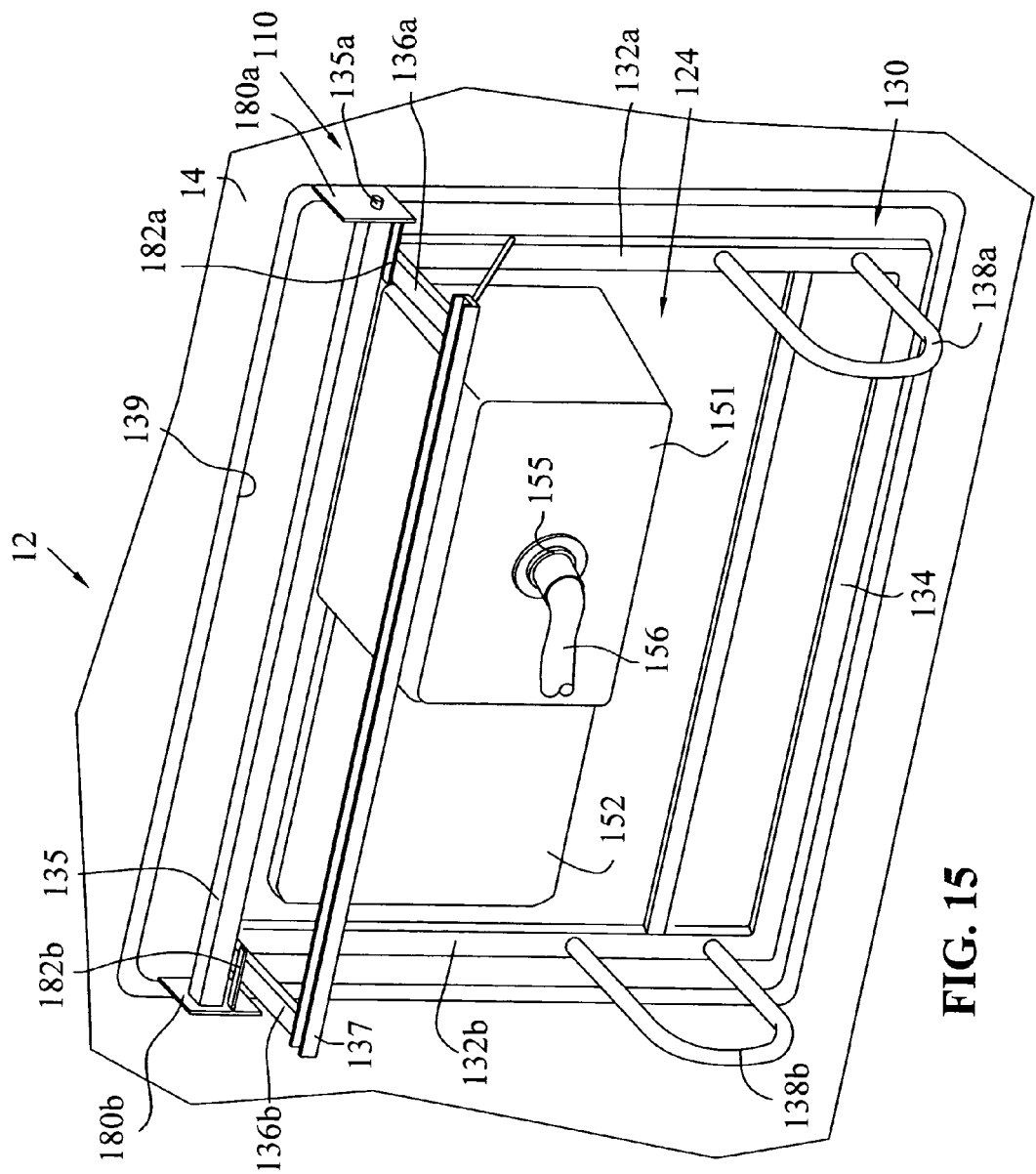
FIG. 15 is a rear perspective view of the alternate embodiment swing out sink in the stowed position with the storage container removed.

Door 122 covers an opening 139 in side wall 14 of recreational vehicle 12 and includes an outer surface 140, an inner surface 142, and upper end 143, and a lower end 144. Door 122 also includes a pair of locking latches 146 for locking the door in a stowed position as shown in FIGS. 11 and 15, and a hinged connection 148 to attach the door to and allow pivotal movement relative to side wall 14 of recreational vehicle 12.

Sink top 124 includes a generally planar surface 150, a sink bowl 151 extending into the working surface, a recessed area 152 adjacent sink bowl 151, and support flanges 153a, 153b. Sink bowl 151 contains a drain opening 155 at the bottom thereof and a fluid outlet line 156, which may be connected to a drain or gray tank (not shown) for discarding used fluid.

Mounted in an aperture 159 in side wall 14 of recreational vehicle 12, sink assembly 110 also includes a water hookup generally indicated as 160. Water hookup 160 includes a housing 161, a pair of fluid control knobs 162a, 162b for controlling fluid flow and temperature to a fluid inlet fitting 164. The fluid inlet fitting 164 may be coupled to a cold water supply tank and a hot water supply tank (not shown) contained in recreational vehicle 12. Hingeably connected to housing 161, is an access door 166 having a locking latch 167 to cover and protect the fluid control knobs and fluid inlet fitting when not in use.

Storage container 126 has a generally cylindrical configuration in the embodiment shown and includes a bottom wall 170, a side wall 171 and a cover 172. Cover 172 includes a locking latch 173 for removably latching cover 172 to side wall 171. Cover 172 may be completely removable or hingeably connected to the storage container. It should also be appreciated that bottom wall 170 may also include a removable or hingeably connected cover for providing access to store plumbing apparatuses in the hollow cylinder portion.

Figure 12:
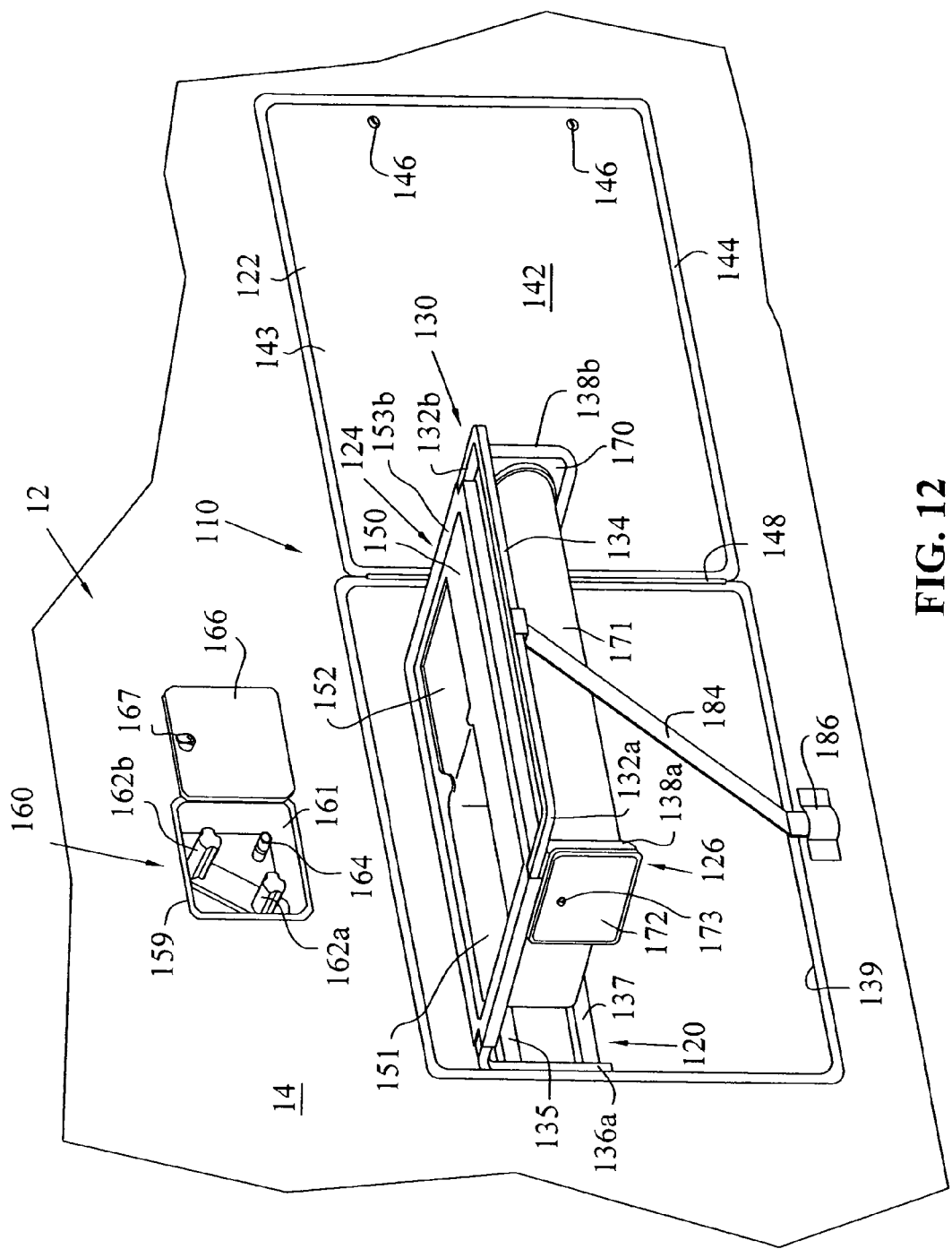
FIG. 12 is a perspective view of the alternate embodiment swing out sink shown in an operational position.
Figure 13:
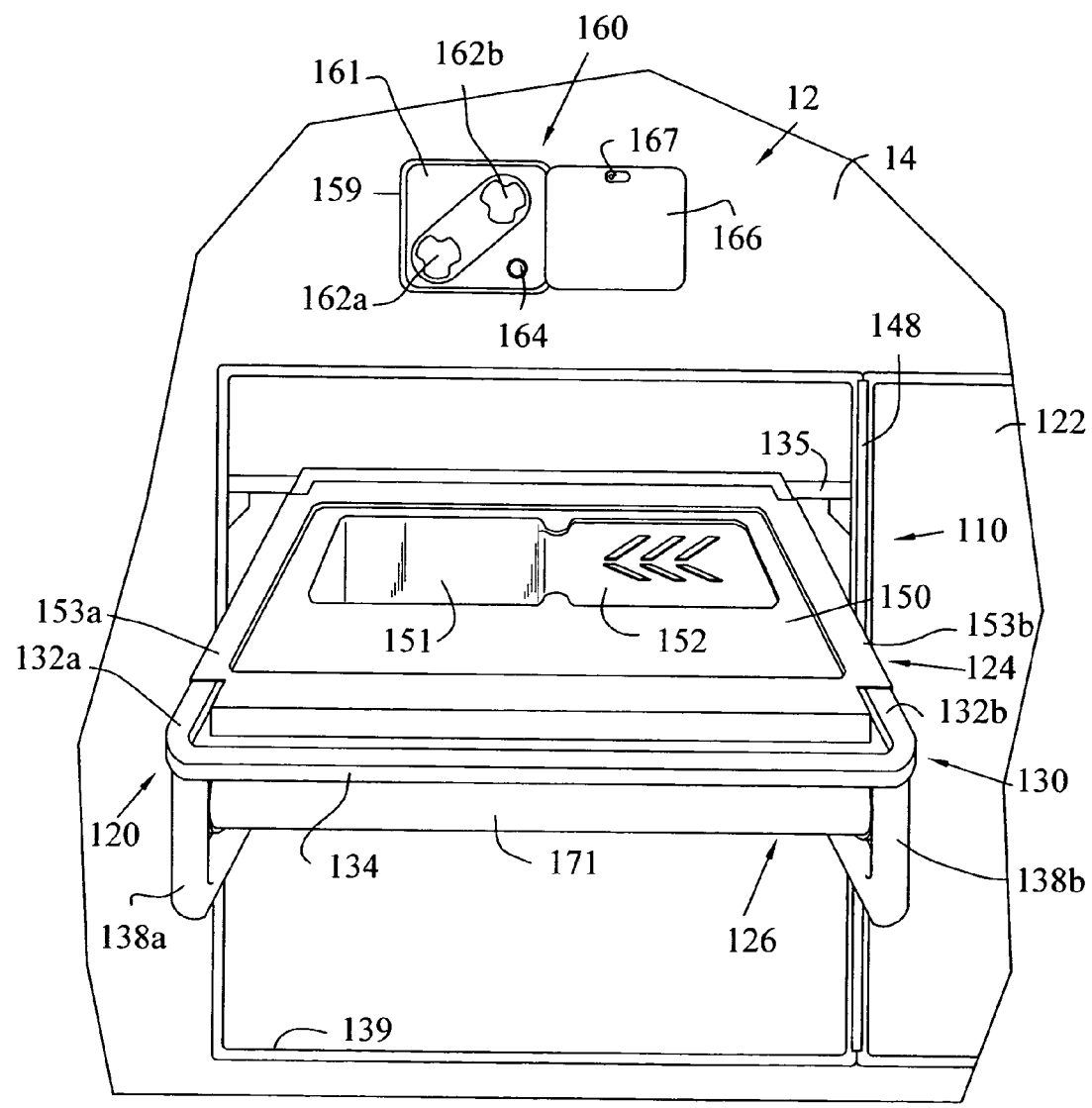
FIG. 13 is a front perspective view of the alternate embodiment swing out sink.

Sink assembly 110 also includes a pair of mounting brackets 180*a*, 180*b* attached to side wall 14 of recreational vehicle 12. Stops 182*a*, 182*b* may be mounted on the brackets to secure the mounting frame in the stowed position. Sink assembly 110 may also include a moveable brace 184 that can be mounted in a bracket 186 as shown in FIG. 12 for supporting sink top 124 in the operational position.

Regarding the operation and use of sink assembly 110, the assembly is shown in the stowed or travel position in FIGS. 11 and 15. In the stowed position, sink top 124 is oriented in a generally vertical position with the front portion of the sink top and front frame member 134 adjacent the bottom of aperture 159 and side wall 14. The sink is held firmly in the stowed position by locking latches 146 on door 122 and stops 182*a*, 182*b*. Door 122 prevents sink top 124 from moving or swing forward in the stowed position, and stops 182 prevent further pivotal backward movement of the sink top by bearing against leg members 136*a*, 136*b*. Also in the stowed position, access door 166 can be secured using locking latch 167 to protect fluid inlet fitting 164 and fluid control knobs 162*a*, 162*b*.

Figure 14:
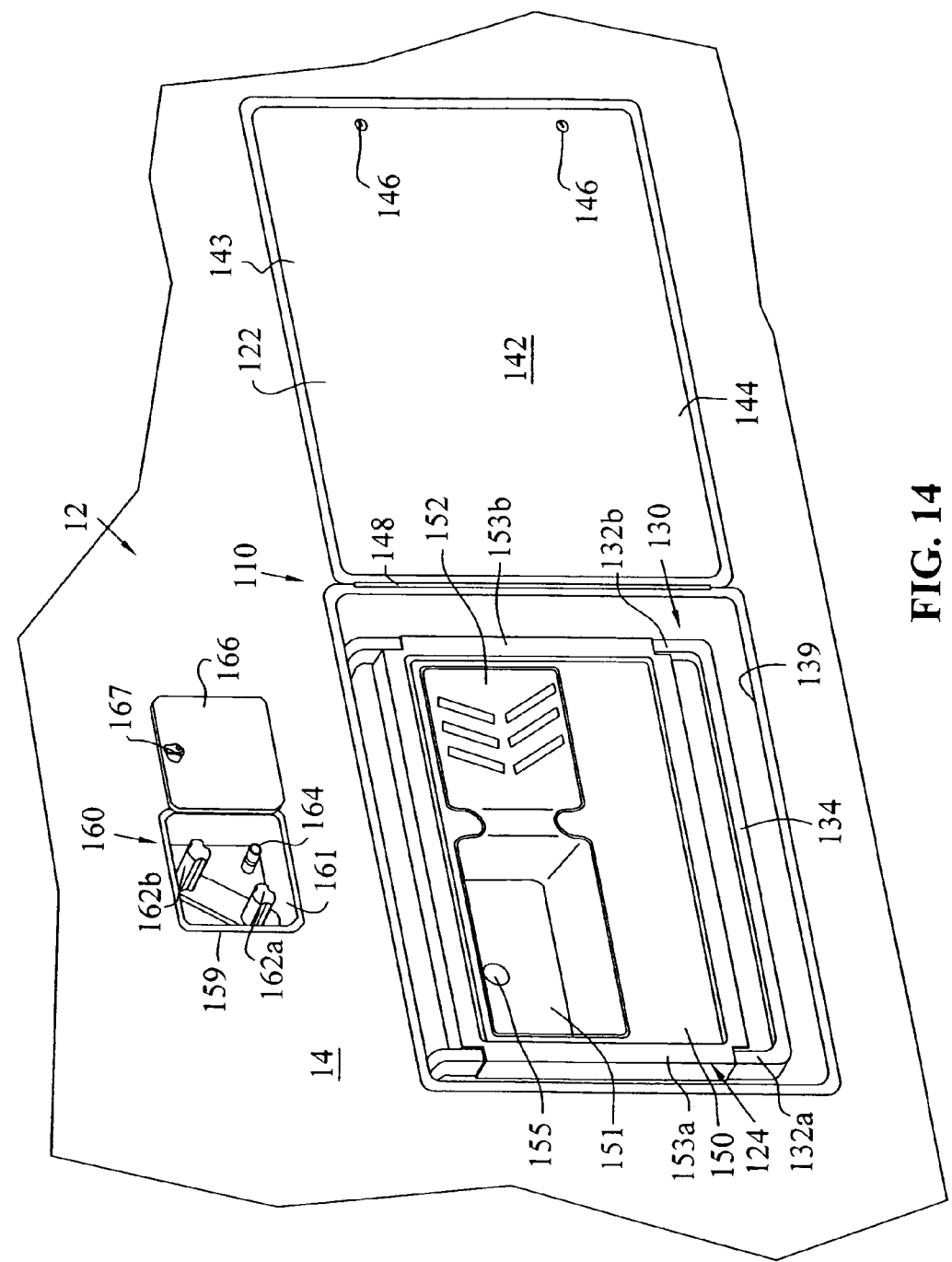
FIG. 14 is a front perspective view of the alternate embodiment swing out sink shown in the stowed position, but with the door open.

When vehicle 12 is stopped and it is desired to use sink assembly 110, access doors 122 and 166 may be opened to expose the sink top and water hookup as shown in FIG. 14. From this position, the front portion of sink top 22 is pivoted or swung up to the position shown in FIGS. 12 and 13. Sink top 22 pivots about pins 135*a* and 135*b* which are rotatingly inserted in respective mounting brackets 180*a*, 180*b*. When sink top 124 is in the operational or generally horizontal position shown in FIGS. 12 and 13, a brace such as 184 may be inserted into bracket 186 to firmly secure the sink. In the embodiment shown, the top of brace 184 supports front frame member 134. It should be appreciated that the sink assembly may also be used without the brace, and instead a detent or locking mechanism (not shown) may be used to hold mounting frame 120 in the operational position. Furthermore, mounting frame 120 could be extended to allow angular braces between generally rectangular portion 130 and the leg members.

To supply water for use with sink assembly 110, faucet 28 or hose assembly 29, as shown for use with sink assembly 10, may also be used with sink assembly 110. In addition, the plumbing apparatus disclosed in U.S. Application Ser. No. 60/556,159, filed on Mar. 25, 2004 to the same Applicant, and which is incorporated herein by reference, may also be used with the present invention.

When it is desired to store the sink for travel, disassembly may be done in the reverse manner of assembling the sink for use as discussed above, and the plumbing apparatuses can be stored in storage container 126.

Also, although the sink assembly has been shown on a type of recreational vehicle that is commonly referred to as a motor home, it may also be used on any other known type of recreational vehicles such as trailers, fifth wheels, or pop up campers. The invention may also be used on other types of vehicles such as boats or railroad cars or may be mounted on prefabricated homes. As such, the described embodiments are to be considered in all respects only as illustrative and not restrictive. The scope of the invention is, therefore, indicated by the following claims rather than by the description.

What is claimed is:

1. A sink assembly for use on a vehicle, the sink assembly comprising:
    a mounting frame for mounting the sink assembly to the vehicle, said mounting frame being pivotally attached to the vehicle;
    a door movable relative to said mounting frame and covering an opening in the vehicle;
    a sink top having a sink bowl with a drain, said sink top moveable through the opening between a stowed position in the vehicle when not in use or when the vehicle is traveling to an operational position for use of the sink assembly; and
    at least one attachable plumbing apparatus connectable to a fluid source through a fitting mounted to the vehicle above the opening.

2. The sink assembly of claim 1, further including a storage container for storing said plumbing apparatus when not in use or when said sink top is in the stowed position.

3. The sink assembly of claim 2, wherein the plumbing apparatus comprises at least one of a faucet or a hose assembly.

4. The sink assembly of claim 3, further including a valve coupled to said fitting of said fluid inlet line, said valve operable between a first state enabling fluid flow and a second state inhibiting fluid flow.

5. The sink assembly of claim 4, wherein said valve is a quick connect coupling and stopper valve.

6. The sink assembly of claim 5, wherein said plumbing apparatus has a fitting connectable to said quick connect coupling.

7. The sink assembly of claim 1, wherein said door is attached at the opening with a hinged connection.

8. The sink assembly of claim 7, wherein said hinged connection is on a side of said door.

9. The sink assembly of claim 1, wherein said sink top hangs in a generally vertical orientation when said sink assembly is in the stowed position.

10. The sink assembly of claim 9, wherein a front portion of said sink top hangs below a back portion when in the stowed position, said front portion swinging up when said sink top is moved to the operational position.

11. A sink assembly for use on a vehicle, the sink assembly comprising:
    a mounting frame for mounting the sink assembly to the vehicle said mounting frame being pivotally attached to the vehicle;
    a door moveable relative to said mounting frame and covering an opening in the vehicle;
    a sink top having a sink bowl with a drain, said sink top being movable through the opening between a stowed position in the vehicle when not in use or when the vehicle is traveling to an operational position for use of the sink assembly, and said sink top having a front portion and a rear portion, said front portion hanging below said rear portion in the stowed position, and said front portion swinging up to the operational position.

12. The sink assembly of claim 11, further including a brace that supports said front portion of said sink top when in the operational position.

13. The sink assembly of claim 11, further including a storage container for storing a plumbing apparatus when not in use.

14. The sink assembly of claim 13, wherein said storage container is located beneath said sink top.

15. The sink assembly of claim 11, wherein said mounting frame includes members lying in a plane substantially the same as a plane defined by said sink top, and other members lying in a plane generally perpendicular to the plane defined by said sink top.

16. The sink assembly of claim 11, further including a fitting mounted to the vehicle above the opening for attachment of a plumbing apparatus.

17. A sink assembly for use on a vehicle having a water supply system, the sink assembly comprising:
- a mounting frame for mounting the sink assembly to the vehicle, said mounting frame moveably mounted adjacent an opening in a side wall of the vehicle;
- a sink top moveable between a stowed position wherein said sink top is located within the vehicle when not in use or for travel to an operational position wherein said sink top is located substantially on the exterior of the vehicle;
- at least one plumbing apparatus connectable to the water supply system for dispensing water and having a quick connect coupling to disconnect the plumbing apparatus when not in use; and
- a storage container attached to and movable with said sink top for storing said plumbing apparatus in when not being used.

18. A sink assembly for use on a vehicle having a water supply system, the sink assembly comprising:
- a mounting frame for mounting the sink assembly to the vehicle, said mounting frame moveably mounted adjacent an opening in a side wall of the vehicle;
- a sink top moveable between a stowed position wherein said sink top is located within the vehicle when not in use or for travel to an operational position wherein said sink top is located substantially on the exterior of the vehicle, at least a portion of said sink top moving through the opening in the sidewall of the vehicle as said sink top moves between the stowed position and the operational position;
- at least one plumbing apparatus connectable to the water supply system for dispensing water; and
- a storage container for storing said plumbing apparatus in when not being used.

19. A sink assembly for use on a vehicle having a water supply system, the sink assembly comprising:
- a mounting frame for mounting the sink assembly to the vehicle, said mounting frame moveably mounted adjacent an opening in a side wall of the vehicle;
- a sink top moveable between a stowed position wherein said sink top is located within the vehicle when not in use or for travel to an operational position wherein said sink top is located substantially on the exterior of the vehicle and said sink top being in a generally vertical orientation when in the stowed position and in a generally horizontal orientation in the operational position;
- at least one plumbing apparatus connectable to the water supply system for dispensing water; and
- a storage container for storing said plumbing apparatus in when not being used.

20. The sink assembly of claim 19, wherein said sink top has a front portion and a rear portion, and said front portion is lower than said rear portion when the sink assembly is in the stowed position, and the front portion swings up to the operational position.

* * * * *